US012659574B2

(12) United States Patent
Kapinos et al.

(10) Patent No.: US 12,659,574 B2
(45) Date of Patent: Jun. 16, 2026

(54) METHOD TO PREVENT USER FROM INVALIDATING IMAGE PROCESSING

(71) Applicant: Lenovo (Singapore) Pte. Ltd., Singapore (SG)

(72) Inventors: Robert J. Kapinos, Morrisville, NC (US); Robert James Norton, Jr., Morrisville, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 163 days.

(21) Appl. No.: 18/424,331

(22) Filed: Jan. 26, 2024

(65) Prior Publication Data

US 2025/0247610 A1 Jul. 31, 2025

(51) Int. Cl.
*H04N 23/60* (2023.01)

(52) U.S. Cl.
CPC .................................. *H04N 23/64* (2023.01)

(58) Field of Classification Search
CPC ...... H04N 23/64; H04N 23/62; H04N 23/631; H04N 23/61
See application file for complete search history.

(56) References Cited

U.S. PATENT DOCUMENTS 8,797,445 B2 * 8/2014 Kang ................... H04N 23/611
                                                      348/340
2008/0239104 A1 * 10/2008 Koh ....................... H04N 23/64
                                                      348/240.99

* cited by examiner

*Primary Examiner* — Ahmed A Berhan
(74) *Attorney, Agent, or Firm* — Osha Bergman Watanabe & Burton LLP

(57) ABSTRACT
A method of operating a computing device with a camera includes: obtaining an image requirement from consumers of the camera; obtaining an image from the camera; determining, before the image is directed to the consumers, whether or not the image satisfies the image requirement; upon determining that the image requirement is satisfied, directing the image to the consumers; and upon determining that the image requirement is not satisfied, transmitting a command based on the image being non-compliant with the image requirement.

9 Claims, 6 Drawing Sheets

30

Preprocessor

Adjusting Consumer A

Consumer B

Consumer C

Consumer D

Command

➡ Image

→ Image Requirement

┈┈► Adjustment Control

Adjusting Consumer A

Consumer B

Consumer C

Consumer D

Limit Adjustment Range

Warn User

Inform of Non-compliant Image

Command

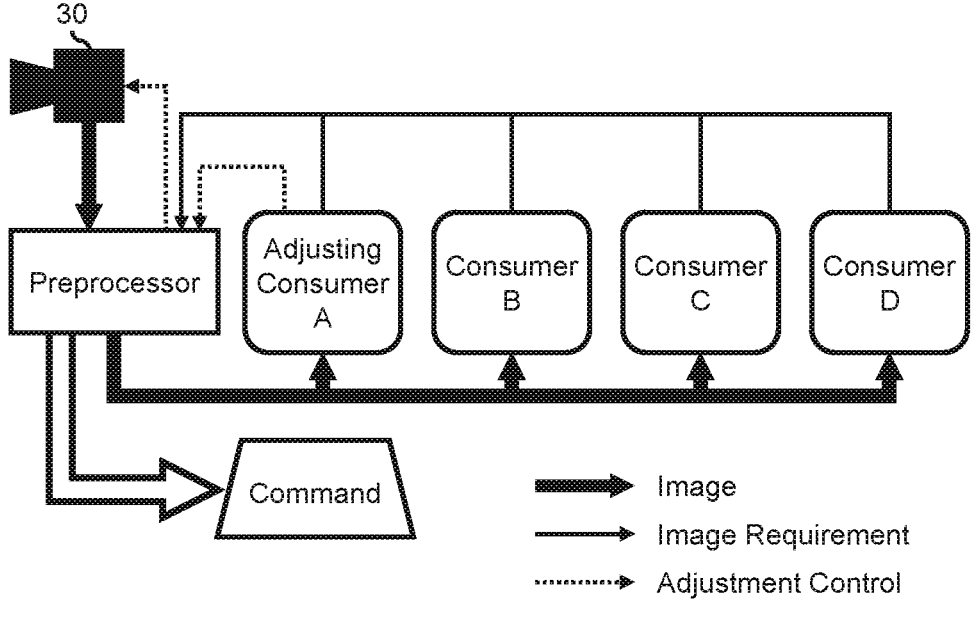
*FIG. 4A*
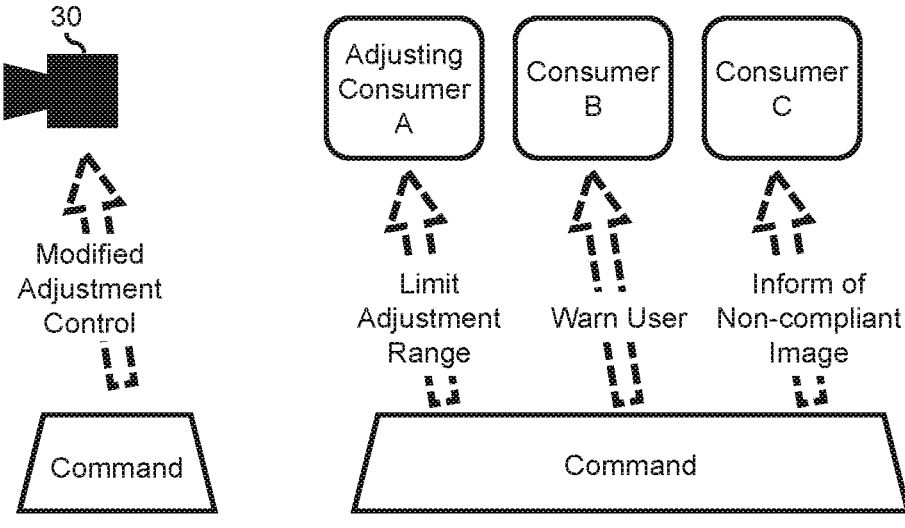
*FIG. 4B*                  *FIG. 4C*

METHOD TO PREVENT USER FROM INVALIDATING IMAGE PROCESSING

TECHNICAL FIELD

The present disclosure relates to a method of controlling a computing device with a camera.

BACKGROUND

Computing devices with a camera (e.g., laptops) generally utilize asynchronous control from multiple applications to control the camera. Because the same image output from the camera to all consumers (e.g., applications, apps, programs, services) of the computing device, there is a risk that an asynchronous adjustment control from one consumer may adjust the image in such a way that it becomes unsuitable for use by a different consumer. For example, processing techniques such as background removal or human presence detection may have minimum acceptable image requirements before the processing technique becomes compromised (e.g., poor quality output, incorrect output, process failure). Conflicts between the image requirements of different consumers may be unintuitive (or entirely unknown) to users and the resulting compromised behavior of the consumers can be unsettling to the users. Management of the image requirements of the consumers and adjustment controls of the camera is required to ensure full utility of the camera.

SUMMARY

In general, one or more embodiments of the invention relate to a method of operating a computing device with a camera. The method includes: obtaining an image requirement from consumers of the camera; obtaining an image from the camera; determining, before the image is directed to the consumers, whether or not the image satisfies the image requirement; upon determining that the image requirement is satisfied, directing the image to the consumers; and upon determining that the image requirement is not satisfied, transmitting a command based on the image being non-compliant with the image requirement.

In general, one or more embodiments of the invention relate to a non-transitory computer readable medium (CRM) storing computer readable program code for operating a computing device with a camera. The computer readable program code causes the computing device to: obtain an image requirement from consumers of the camera; obtain an image from the camera; determine, before the image is directed to the consumers, whether or not the image satisfies the image requirement; upon determining that the image requirement is satisfied, direct the image to the consumers; and upon determining that the image requirement is not satisfied, transmit a command based on the image being non-compliant with the image requirement.

In general, one or more embodiments of the invention relate to a computer device comprising: a camera configured to generate an image; a processor configured to use the image based on consumers of the camera; and a preprocessor configured to analyze the image before usage by the processor. The preprocessor is configured to: obtain an image requirement from consumers of the camera; obtain an image from the camera; determine, before the image is directed to the consumers, whether or not the image satisfies the image requirement; upon determining that the image requirement is satisfied, direct the image to the consumers;

and upon determining that the image requirement is not satisfied, transmit a command based on the image being non-compliant with the image requirement.

Other aspects of the invention will be apparent from the following description and the appended claims.

BRIEF DESCRIPTION OF DRAWINGS

FIGS. 4A-4C show examples of camera adjustment control workflows in accordance with one or more embodiments.

DETAILED DESCRIPTION

Figure 1A:
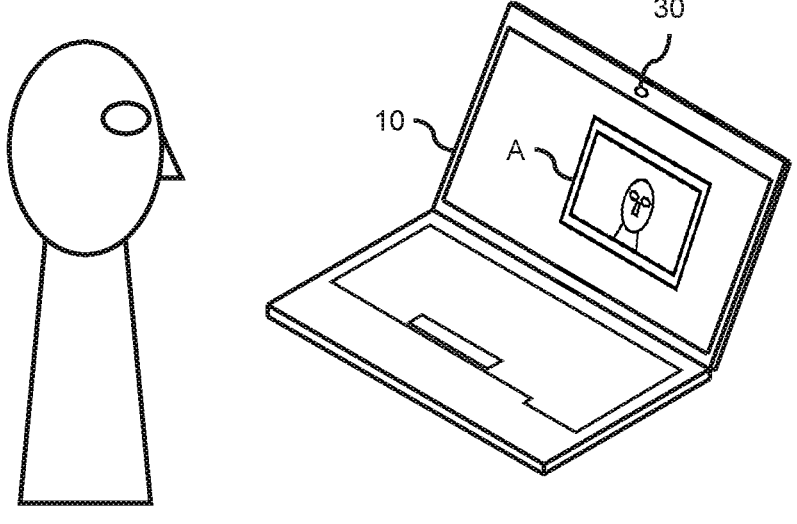
FIG. 1A shows a perspective view of a computing device in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

As discussed above, a computing device may include multiple consumers that are expected to share control of a camera sensor and utilize the same image output by the camera. Conflicts based on the different image requirements of the consumers may cause inconvenience for users. For example, if a facial tracking service adjusts the integration time of the camera to change contrast levels in the image output by the camera, a background removal service may fail (e.g., produce an undesired output) if the new contrast levels of the image blur the foreground/background boundary too much.

To avoid conflicts, one or more embodiments of the present invention utilize a first-pass image analysis technique by a preprocessor to determine whether the image is suitable for one or more consumers of the computing device. In addition, one or more embodiments of the present invention further utilize a first-pass adjustment control analysis technique by the preprocessor to determine whether or not an adjustment control being sent to the camera would generate a conflict. Based on theses analysis techniques, various actions may be taken to prevent the conflict, minimize effects of the conflict, and/or notify one or more consumers or users of the conflict.

FIG. 1A shows a perspective view of a computing device 10 in accordance with one or more embodiments of the invention.

The computing device 10 (e.g., laptop personal computer (PC), tablet PC, desktop PC, convertible PC) is equipped with at least one camera 30. The computing device 10 is configured to utilize a plurality of consumers that utilize an image (e.g., single image, multiple images, video segment, video stream) output by the camera 30. In the non-limiting example shown in FIG. 1A, a video conference software (i.e., consumer A) displays an image of the user to on the computing device 10 and shares the image to other participants of the video conference call.

While the following embodiments are described with respect to an integrated webcam, the invention may be directed to any type of image sensor device connected to the computing device 10 (e.g., a peripheral camera, a networked camera, a front-facing camera, a multi-sensor camera).

Figure 1B:
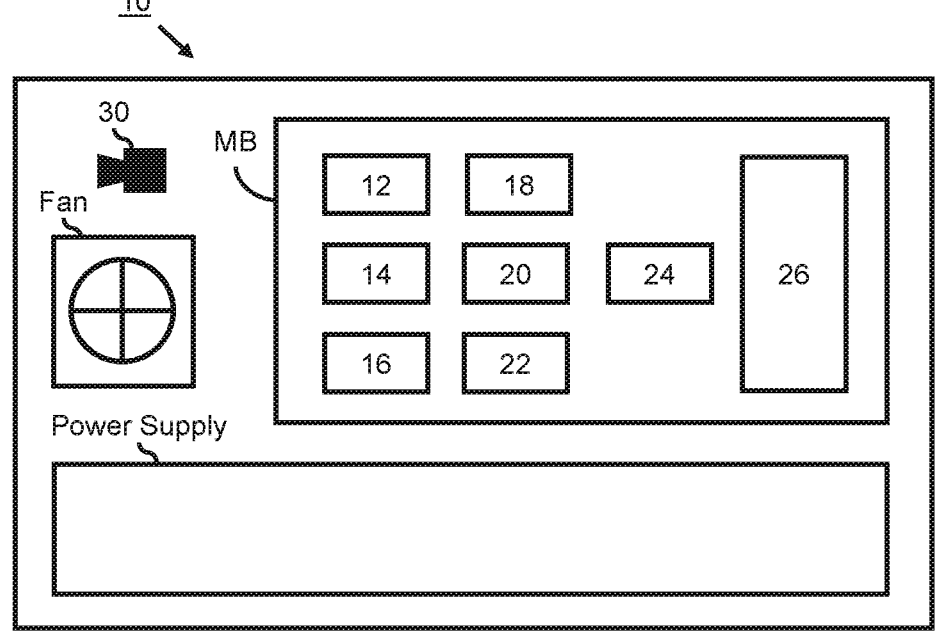
FIG. 1B shows a schematic of various subcomponents included in the computing device of FIG. 1A in accordance with one or more embodiments of the invention.

FIG. 1B shows a schematic of various subcomponents included in the computing device 10 of FIG. 1A in accordance with one or more embodiments of the invention.

The computing device 10 includes the camera 30 and a motherboard MB with a plurality of subcomponents. The subcomponents installed on the motherboard MB may include a central processing unit (CPU) 12, a memory 14, a graphics processing unit (GPU) 16 (e.g., a video subsystem), a chipset 18, a firmware memory 20, an embedded controller 22, a power control circuit 24, and a storage device 26 (e.g., hard disk drive (HDD), a solid state drive (SSD)). The computing device 10 may further include a fan and a power supply.

In one or more embodiments, the above subcomponents of the computing device 10 may be omitted, included in multiple quantities, combined as a single subcomponent (e.g., a processor that acts as a controller of one or more subcomponents), and/or disposed in other portions of the computing device 10.

For example, the preprocessor that performs the analysis techniques described herein may be an individual component (e.g., a processor), an embedded controller 22 (e.g., a processor directly or indirectly coupled to the camera 30, an image signal processor (ISP) coupled to the camera 30), an application specific integrated circuit (ASIC), a portion of a processor (e.g., a core/region of CPU 12, GPU 16, embedded controller 22), a functional entity implemented by one or more structural processors in the computing device 10 (e.g., distributed implemented of software), a combination of the above, or any appropriate implementation using the configuration of the computing device 10.

In addition, it will be appreciated that other subcomponents (e.g., peripheral devices, removeable components, external power supplies) beyond those listed above may be included, internally or externally, as a subcomponent of the computing device 10 without departing from the scope of the present disclosure.

Figure 2A:
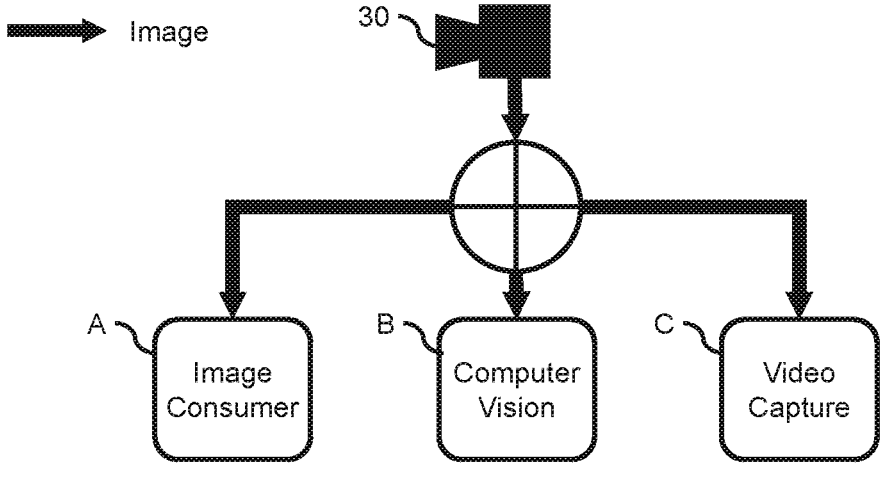
FIGS. 2A-2B show schematics of image or video processing workflows.
Figure 2B:
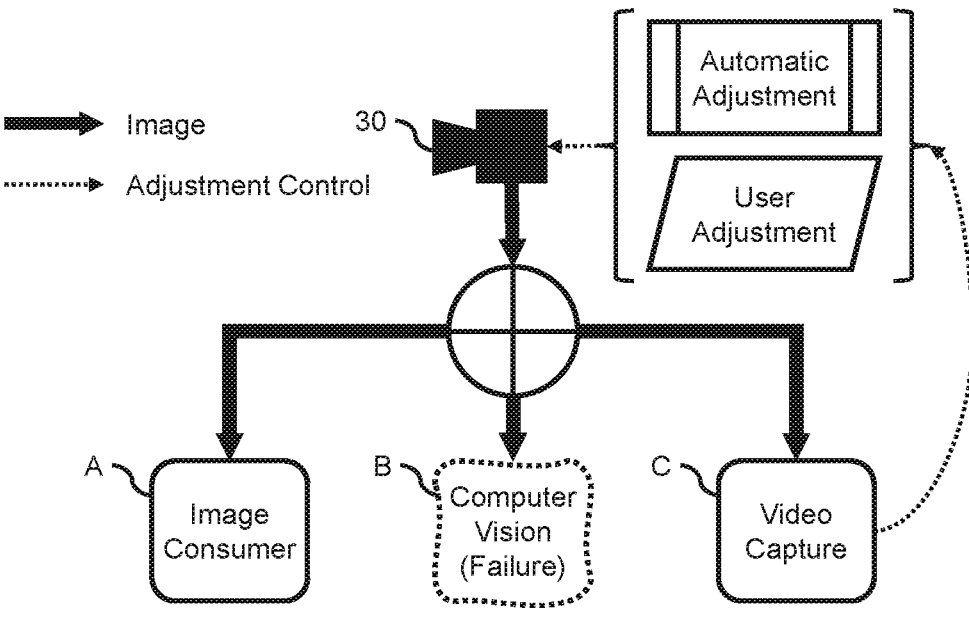

FIGS. 2A-2B show schematics of image or video processing workflows.

The computing device 10 includes one or more consumers that each process or otherwise use the image produced by the camera 30. In the non-limiting example shown in FIG. 2A, consumer A is a camera application for capturing images, consumer B is an application that utilizes computer vision techniques (e.g., image recognition/identification), and consumer C is a video conference call application.

As shown in FIG. 2A, the same image is routed from the camera 30 to each of consumers A, B, C and that same image is used in three different purposes. While the image acquired by camera 30 may be optimized for one consumer, the image may not be optimized for one or more other consumers. For example, the camera 30 may be initially configured with a resolution setting for capturing relatively high resolution images for consumer A. Because the same image is used by all of the consumers A, B, C, the relatively high resolution images output by camera 30 may cause consumer C to struggle with processing the images at a rate necessary for a video conference call.

In FIG. 2B, consumer C transmits, to camera 30, an adjustment control to lower the image resolution to address the performance issues caused by the initial resolution setting. For example, the consumer C may automatically transmit an adjustment control based on performance falling below a predetermined threshold (e.g., user-defined or pre-configured threshold) or a user may manually enter a command to reduce the resolution after witnessing the performance of consumer C. Based on the adjustment control from consumer C, the camera 30 acquires subsequent images with a lower resolution setting and routes the relatively lower resolution images to all of the consumers A, B, C.

While consumer C is satisfied by the lower resolution setting, a conflict may be created with the one or more other consumers. In FIG. 2B, consumer A does not have any resolution requirements and uses the relatively lower resolution images without issue. However, the computer vision technique employed by consumer B has a minimum resolution requirement that conflicts with the lower resolution images. Because this image requirement of the computer vision technique is no longer met, consumer B fails to perform as expected and the user's experience with the computing device 10 is degraded.

To avoid conflicts between consumers, a preprocessor may be configured to determine whether an image and/or an adjustment control is suitable for one or more consumers of the computing device 10. It will be appreciated that other consumers beyond the examples provided in this description may be used and that any number or configuration of consumers may be used without departing from the scope of the present invention.

Figures 3A, 3B:
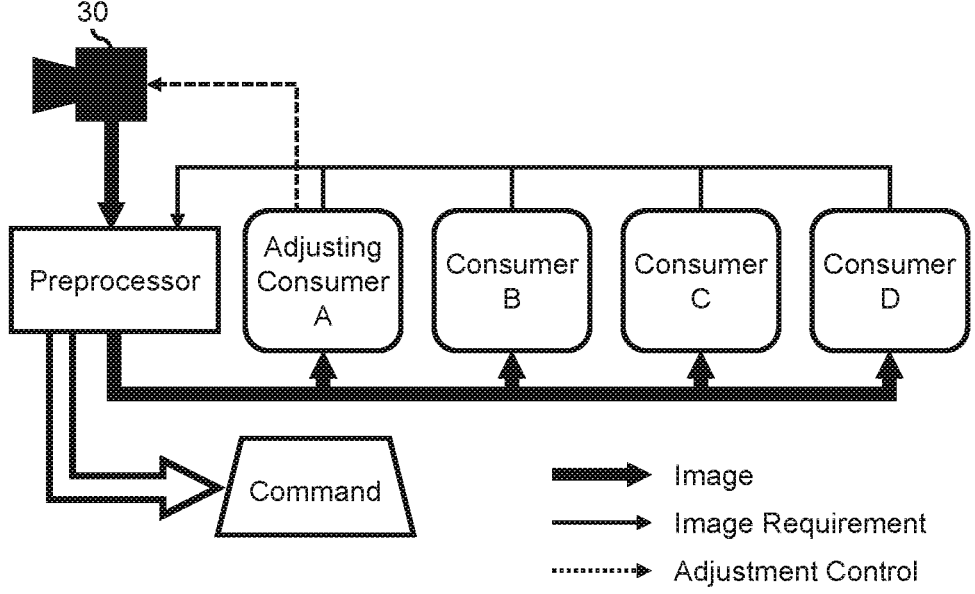
FIGS. 3A-3B show an example of an image requirement workflow in accordance with one or more embodiments.

FIGS. 3A-3B show an example of an image requirement workflow in accordance with one or more embodiments.

In FIG. 3A, one or more embodiments of the invention uses a preprocessor to perform a first-pass image analysis technique to determine whether the image from camera 30 is suitable for one or more consumers of the computing device 10.

Initially, the preprocessor obtains one or more image requirements from one or more consumers of the computing device 10. The consumers may be configured to automatically interface with the preprocessor (e.g., on startup of the computing device, upon any change of a setting or change of an image requirement, periodically, asynchronously, triggered by a request from the preprocessor, triggered by another action/communication). Alternatively, or in addition, the consumer may include an interface for manually sending an image requirement to the preprocessor. In one or more embodiments, the computing device 10 may be configured with a user interface to enable common criteria for legacy consumers (e.g., consumers without defined requirements, consumers that are not configured with an interface).

An image requirement may take many forms. For example, an image requirement may be a limitation (e.g., a criteria threshold) on concrete parameters of the image (e.g., resolution/size, color space, brightness, exposure time, zoom, pan, crop). In one or more embodiments, one or more image processing algorithms performed before the image analysis technique by the preprocessor. Thus, an image requirement may be a limitation on a more complex parameter of the image (e.g., an output results from the image processing algorithm). For example, the image requirement may be based on one or more of the following: darkness detection output, edge detection output, image segmentation output, shape detection output, facial recognition output, focus detection output (e.g., detection of ISP blurred image), blurriness detection output. The image requirement may be a limiting value (e.g., minimum, maximum, threshold level), a limiting range (e.g., inclusive or exclusive), a feature requirement (e.g., presence or absence of a feature), or any appropriate limitation on the image.

In one or more embodiments, an image requirement may include a criteria threshold for a facial recognition algorithm. The criteria threshold may be obtained from a default setting of one of the consumers, a setting input into one of the consumers by a user of the computing device, a predetermined information (e.g., default setting of the consumer), or a real-time communication from the consumers.

In one or more embodiments, the criteria threshold may be based on a parameter of the image. For example, the parameter of the image may be one selected from a group comprising: a resolution, a color space, a brightness, an exposure time, a zoom level, and a pan setting.

In one or more embodiments, the criteria threshold may be based on a detection algorithm of a computer vision consumer of the consumers. For example, the detection algorithm may be one selected from a group consisting of: darkness detection; edge detection; face presence detection; and blurring detection.

In general, an image requirement is a limitation related with performance of the associated consumer. Each image requirement may be configured by the consumer itself (e.g., based on the requirements of the image processing performed by the consumer) or may be configured by a user (e.g., user preference). In one or more embodiments, an image requirement may be blank (i.e., includes no limitations on the image). Alternatively, the preprocessor may be configured to interpret a given consumer with no image requirements (i.e., no information received from the given consumer) as a blank image requirement with no limitations on the image. In other words, the preprocessor may be instructed to always approve the image for use.

While this description includes a limited number of image requirement examples, it will be appreciated that any appropriate limitation on a defined parameter may be used as an image requirement. Accordingly, embodiments of the present invention should not be limited to the above non-limiting examples.

In the non-limiting embodiment shown in FIG. 3A, the preprocessor obtains an image requirement (thin solid line) from each of consumers A, B, C, D. The preprocessor retains the image requirements (e.g., in an associated memory, in memory 14, in storage device 26). The preprocessor then obtains an image (bold solid line) from the camera 30 for comparison with one or more of the image requirements.

In other words, the first-pass image analysis by the preprocessor is one or more comparison to determine whether or not the image from the camera 30 satisfies each of the image requirements of the consumers A, B, C, D. The first-pass image analysis may include one or more determinations corresponding to each of the obtained image requirements. For example, an image requirement for a given color space may correspond to a determination of the pixel colors of the image and/or a determination of the image format (e.g., examining metadata stored in the image). Any appropriate analysis/comparison technique may be used to determine whether or not the image from the camera 30 satisfies a given image requirement.

In one or more embodiments, the first-pass image analysis is performed before the image is routed to each of the consumers A, B, C, D. Based on a result of the first-pass image analysis, the preprocessor may transmit a command, as described in further detail below with respect to FIG. 3B. Furthermore, the routing of the image to the consumers A, B, C, D may be controlled (e.g., allowed or denied) based on a result of the first-pass image analysis.

Alternatively, the first-pass image analysis technique may be performed after the image is routed to each of the consumers A, B, C, D. Accordingly, the image may still be used by the consumers and the preprocessor may subsequently transmit a command and/or provide a result of the first-pass image analysis technique as supplemental information.

A command from the preprocessor may include an instruction and/or a message to one or more of the consumers A, B, C, D. As shown in FIG. 3B, in one or more embodiments, the command may include multiple instructions/messages. For example, the command may include one or more of the following: a message indicating a conflict (e.g., with a given image requirement, with a given consumer); a message indicating that the image from camera 30 is non-compliant with one or more image requirements; an instruction to limit a range of an adjustment control of the camera 30; a message warning that an adjustment control has changed the image.

In the non-limiting embodiment shown in FIGS. 3A-3B, consumer A (i.e., the camera application of FIGS. 2A-2B) transmits an adjustment control to camera 30 to increase an exposure time and subsequently increase the overall brightness of the image produced by camera 30. FIG. 3B shows a command from the preprocessor that includes instructions/messages for each consumer A, B, C, D based on the analysis of the brighter image.

With respect to consumer B, based on the brighter image, the preprocessor may determine that an image requirement for a predetermined range of brightness values for consumer B (i.e., the application that utilizes computer vision techniques) is being approached but not exceeded. Therefore, the command transmitted to consumer B may simply include a warning that another consumer is adjusting the exposure time of the camera 30.

With respect to consumer C, based on the brighter image, the preprocessor may determine that an image requirement for a minimum frame rate for consumer C (i.e., the video conference call application) is exceeded due to the longer exposure time. Therefore, the command transmitted to consumer C may include a message that the image (video) from camera 30 is no longer compliant with the minimum frame rate image requirement. The command may include an instruction to modify the behavior of the consumer to accommodate the non-compliant image (e.g., to disregard image, to disable image processing, to prompt the user to proceed with non-compliant image).

With respect to consumer D, based on the brighter image, the preprocessor may determine that all image requirements from consumer D are satisfied. Therefore, the command may not include a transmission for consumer D. Alternatively, the command may include a message that the image from camera 30 is compliant with all known image requirements for that consumer.

With respect to consumer A, the preprocessor may determine that all image requirements from consumer A are satisfied. However, because a conflict has been identified with at least one consumer, the preprocessor may include an instruction in the command to limit a range of an adjustment control related to the image requirement that was not satisfied. Because the first-pass image analysis technique is based only on the image output by the camera 30, the preprocessor may not be aware of which consumer made the adjustment that created the conflict. Accordingly, the instruction to limit the range of an adjustment control may be transmitted to all consumers A, B, C, D.

It will be appreciated that other combinations of instructions and/or messages may be included in a command transmitted by the preprocessor. In one or more embodiments, multiple commands (e.g., individualized commands for each consumer) are transmitted by the preprocessor. In one or more embodiments, a command may be blank or may not be transmitted to one or more consumers. The scope of the present invention is not limited to the specific examples described herein.

FIGS. 4A-4C show examples of camera adjustment control workflows in accordance with one or more embodiments.

In FIG. 4A, one or more embodiments of the invention uses a preprocessor to perform a first-pass adjustment control analysis technique to determine whether or not an adjustment control sent to the camera 30 will generate a conflict.

Similar to the example shown in FIGS. 3A-3B, the preprocessor initially obtains one or more image requirements from one or more consumers of the computing device 10. In addition, the preprocessor obtains and identifies an adjustment control for the camera 30 before the adjustment control is transmitted to the camera 30. In other words, prior to any change being made to the output of the camera 30, the preprocessor may determine whether or not a conflict will be created by the adjustment control. Based on this determination, the preprocessor may generate and transmit a command including an instruction and/or a message to the camera 30 and/or one or more of the consumers A, B, C, D.

An adjustment control may be any instruction that modifies the operation of the camera 30 or the image (video) output by the camera 30. In one or more embodiments, the adjustment control include a change to one or more of the following settings: resolution/size, white/color balance, exposure time, ISO setting, delay time, lighting (e.g., flash, illumination), focal length, zoom, pan, crop, mode selection (e.g., macro, super macro, image/video, portrait/landscape, timelapse), filters (e.g., blur, overlays, image).

While this description includes a limited number of adjustment control examples, it will be appreciated that any appropriate camera control or camera parameter adjustment may be used as an adjustment control. Accordingly, embodiments of the present invention should not be limited to the above non-limiting examples.

In the non-limiting embodiment shown in FIG. 4A, the preprocessor obtains an image requirement (thin solid line) from each of consumers A, B, C, D. The preprocessor retains the image requirements (e.g., in an associated memory, in memory 14, in storage device 26). Furthermore, the preprocessor obtains an adjustment control (thin dashed line) from a consumer, before the adjustment control is transmitted to the camera 30, for comparison with one or more of the image requirements.

In other words, the first-pass adjustment control analysis by the preprocessor is one or more comparison to determine whether or not the adjustment control will create a conflict with any of the image requirements of the consumers A, B, C, D. The first-pass adjustment control analysis may include one or more determinations corresponding to each of the obtained image requirements. For example, an image requirement for a given color space may correspond to a determination of whether or not the adjustment control includes instructions for the camera 30 to use a non-compliant color space. Any appropriate analysis/comparison technique may be used to determine whether or not the adjustment control satisfies a given image requirement.

The first-pass adjustment control analysis is performed before the adjustment control is transmitted to the camera 30 and before any image is routed to each of the consumers A, B, C, D. Based on a result of the first-pass adjustment control analysis, the preprocessor may transmit a command, as described in further detail below with respect to FIG. 4B. Furthermore, the routing of the adjustment control to the camera 30 and the routing of the image to the consumers A, B, C, D may be controlled (e.g., allowed or denied) based on a result of the first-pass adjustment control analysis.

A command from the preprocessor may include an instruction to the camera 30 (e.g., the original adjustment control, a modified adjustment control) and/or an instruction/message to one or more of the consumers A, B, C, D. In one or more embodiments, the command may include multiple instructions/messages.

Similar to the example in FIGS. 3A-3B, the adjustment control in FIGS. 4A-4C is an instruction to increase the exposure time of the camera 30. In this non-limiting example, the preprocessor may determine that an image requirement for a predetermined range of exposure time for one or more consumers (e.g., consumer C) is not satisfied by the increased exposure time in the adjustment control.

In one or more embodiments, the preprocessor may modify the adjustment control to satisfy the image requirement for consumer C. As shown in FIG. 4B, the preprocessor may generate and transmit a modified adjustment control to the camera 30. The modified adjustment control may be a scaled, offset, or otherwise modified version of the original adjustment control. The modified adjustment control may be generated to satisfy at least one image requirement that would not be satisfied by the original adjustment control.

In one or more embodiments, the preprocessor may forward the adjustment control to the camera 30 without modification and sends a command to one or more consumers. As shown in FIG. 4C, the command may include different instructions/messages for each consumer based on whether or not the image requirements of the given consumer and the adjustment control that is transmitted to the camera 30.

With respect to consumer A, based on the original adjustment control creating a conflict with another consumer, the command may include and instruction for consumer A to limit the range for adjustment control (e.g., prevent the user or an algorithm from increasing the exposure time beyond the image requirement of consumer C in the future).

With respect to consumer B, the preprocessor may determine that the adjustment control approaches, but does not exceeded, the image requirement for the application that utilizes computer vision techniques. Therefore, the command transmitted to consumer B may simply include a warning that another consumer is adjusting the exposure time of the camera 30.

With respect to consumer C, based on the higher exposure time in the adjustment control not satisfying the image requirement for consumer C, the command may include a message that the image (video) from camera 30 is no longer compliant with the image requirements of the consumer.

In one or more embodiments, the preprocessor may perform both of the above processes (i.e., transmits a command that (1) modifies the original adjustment control for the camera 30 and (2) includes instructions/messages for one or more consumers).

Furthermore, in one or more embodiments, the command may include additional information that is transmitted to the consumers. For example, the command may include information about which image requirements are satisfied/not satisfied, which consumers are satisfied/not satisfied, which adjustment controls have been transmitted in original form or modified, or any additional contextual information that may be used by the consumers to resolve a conflict.

It will be appreciated that other combinations of adjustment controls, instructions, and/or messages may be included in a command transmitted by the preprocessor. In one or more embodiments, multiple commands are transmitted by the preprocessor. In one or more embodiments, a command may be blank or may not be transmitted to the camera 30 (i.e., the original adjustment control is prevented from adjusting the camera 30) or one or more consumers. The scope of the present invention is not limited to the specific examples described herein.

After the preprocessor obtains an image (bold solid line) from the camera 30, with the original adjustment control or the modified adjustment control, the preprocess may proceed with a comparison of the image with the image requirements. Based on the first-pass adjustment control analysis, one or more comparisons of the first-pass image analysis may be skipped as a conflict has already been flagged by the first-pass adjustment control analysis. Accordingly, in one or more embodiments, the routing of the image to the consumers A, B, C, D may be controlled (e.g., allowed or denied) based on a result of the first-pass adjustment control analysis and/or the first-pass image analysis. Likewise, the preprocessor may transmit a command based on based on a result of the first-pass adjustment control analysis and/or the first-pass image analysis (e.g., separate commands for each analysis, consolidated command for both analyses).

Figure 5:
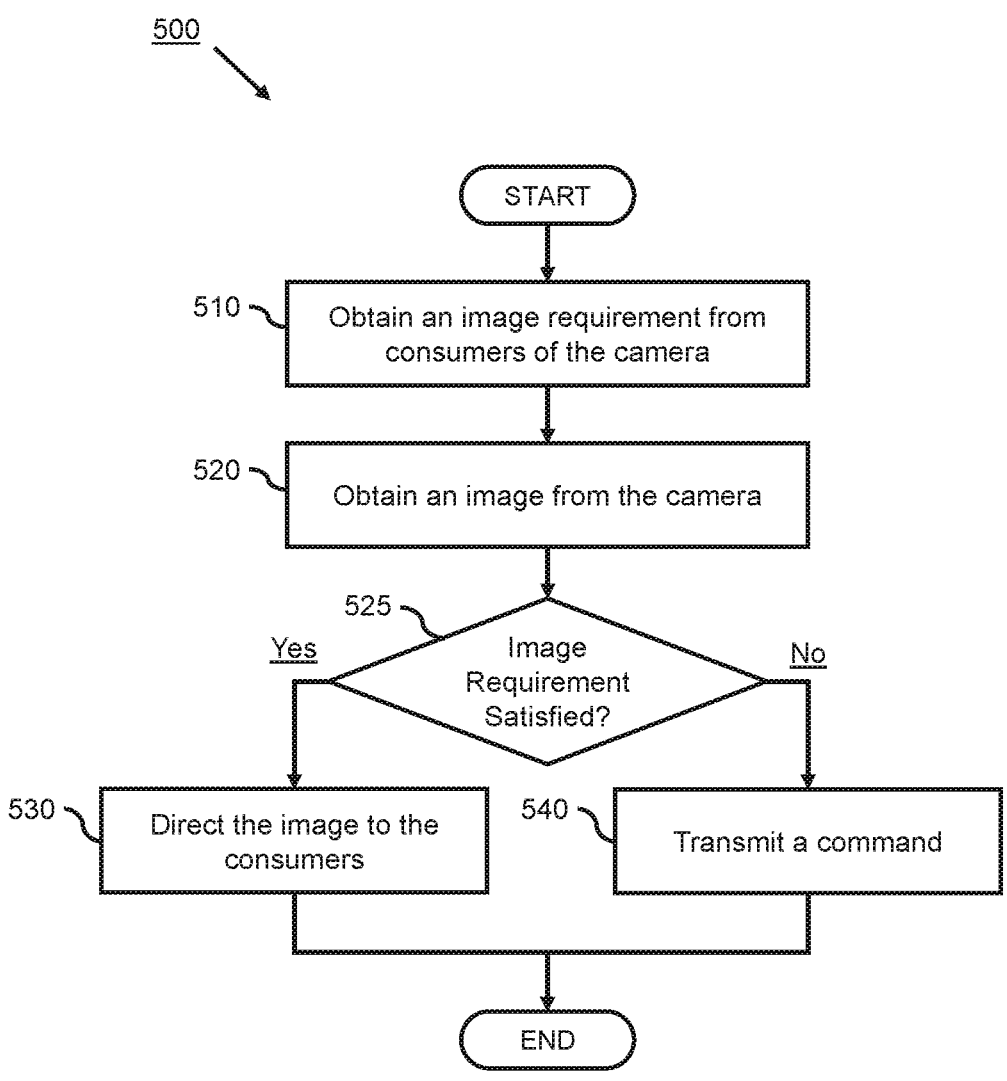
FIG. 5 shows a flowchart of a method in accordance with one or more embodiments of the invention.
Figure 6:
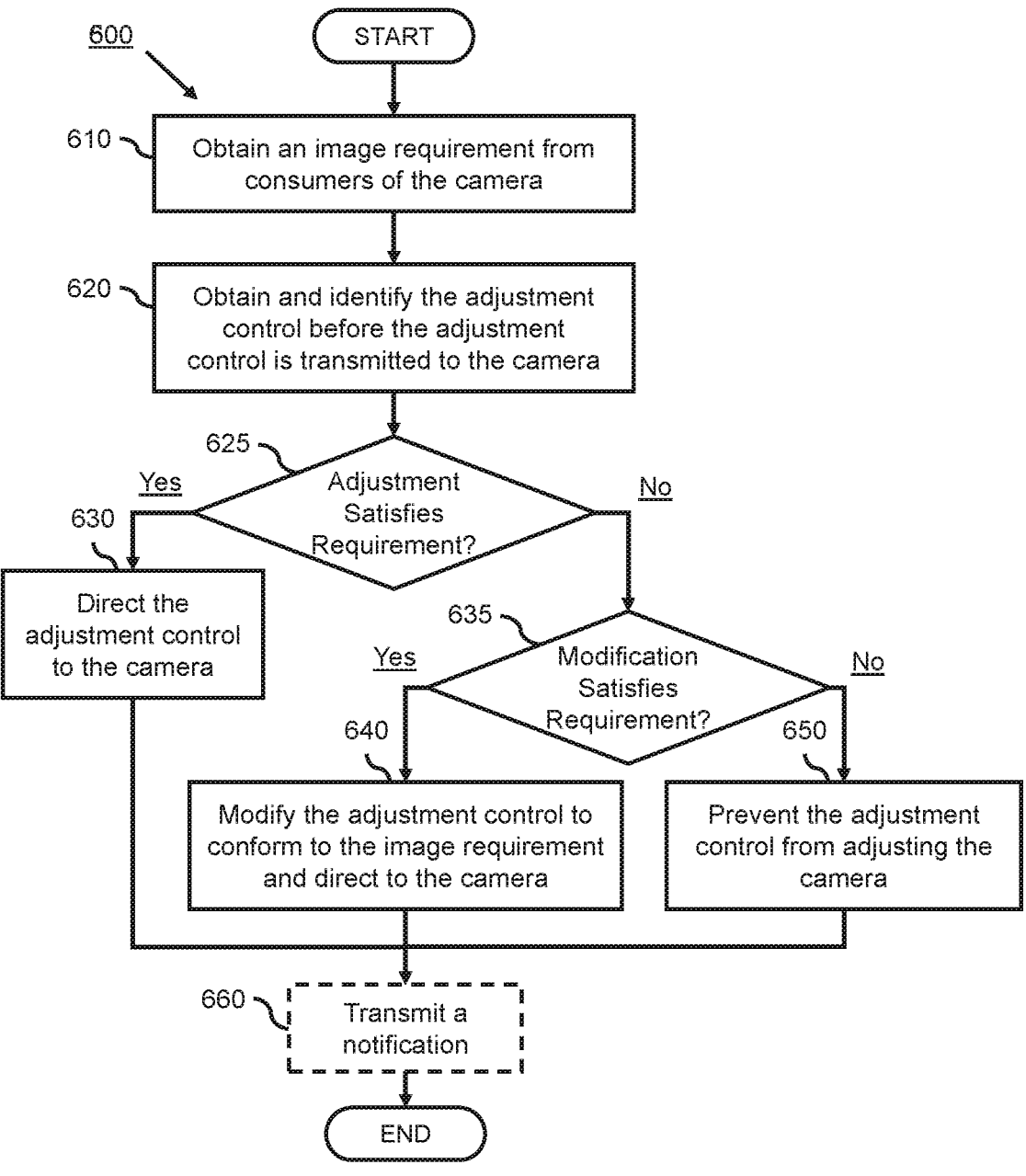
FIG. 6 shows a flowchart of a method in accordance with one or more embodiments of the invention.

FIGS. 5-6 show flowcharts describing example methods 500, 600 for operating a computing device with a camera in accordance with one or more embodiments. One or more of the processes in FIGS. 5-6 may be performed by various components of the computing device 10 described with reference to FIGS. 1A-1B. The methods 500, 600 may be executed in part one or more processors (e.g., the preprocessor, the processor 12, the embedded controller 22).

FIG. 5 shows a flowchart of a method in accordance with one or more embodiments of the invention.

At 510, the preprocessor obtains an image requirement from consumers of the camera 30. The preprocessor may obtain any number of image requirements from any number of consumers.

At 520, the preprocessor obtains an image from the camera 30.

At 525, before the image is directed to the consumers, the preprocessor determines whether or not the image satisfies the image requirement. The determination includes the first-pass image analysis described above. In other words, the preprocessor analyzes the image for concrete parameters (e.g., resolution/size, color space, brightness, exposure time, zoom, pan, crop) to compare with a corresponding limitation described by the image requirement. Alternatively, or in addition, the preprocessor analyzes a complex parameter of the image that may require an interim image processing step/algorithm. Any appropriate analysis/comparison technique may be used to determine whether or not the image satisfies a given image requirement.

When the determination at 525 is YES (i.e., the image requirement is satisfied), the process continues to 530.

At 530, the preprocessor directs the image to the consumers.

When the determination at 615 is NO (i.e., the image requirement is not satisfied), the process continues to 540.

At 540, the preprocessor transmits a command based on the image being non-compliant with the image requirement. The commands includes one or more instructions/messages for one or more consumers based on the analysis of the brighter image.

An instruction in the command may change a behavior of one or more consumers. In one or more embodiments, the command includes a notification that the image is non-compliant with the image requirement. Based on the notification, at least one of the consumers may modify an adjustment control range of the camera 30. It will be appreciated that any valid instruction (e.g., modify a function, modify a control range, modify a process/analysis performed by the consumer) may be included in the command.

In one or more embodiments, the command may include an instruction for a consumer to conserve computational resources by deactivating or entering a reduced mode (e.g., a sleep state, a partially active state (e.g., camera stream disabled while other functions remain)). A subsequent command to restore the consumer may be issued by the preprocessor when the image requirement is satisfied.

In one or more embodiments, a notification in the command from the preprocessor may that identifies the image requirement and the adjustment control.

Furthermore, the preprocessor may direct the image to one or more consumers with satisfied image requirements. In one or more embodiments, in addition to the command, the preprocessor may direct the image to one or more consumers with image requirements that are not satisfied.

FIG. 6 shows a flowchart of a method in accordance with one or more embodiments of the invention.

At 610, the preprocessor obtains an image requirement from consumers of the camera 30. The preprocessor may obtain any number of image requirements from any number of consumer.

At 620, the preprocessor obtains and identifies an adjustment control before the adjustment control is transmitted to the camera 30.

At 625, after obtaining the image requirement and identifying the adjustment control, the preprocessor determines whether or not the adjustment control satisfies the image requirement (or image requirements). The determination includes the first-pass adjustment control analysis described above.

In other words, the preprocessor analyzes the adjustment control to determine whether an image generated with the settings included in the adjustment control will satisfy the image requirement. In one or more embodiments, the image requirement may include an explicit information element that can be directly compared with the adjustment control (e.g., an image requirement for no flash or illumination control would directly conflict with an adjustment control to turn on a flash or illumination setting). Alternatively, or in addition, the preprocessor may use predictive algorithms or known values from reference information (e.g., predetermined adjustment control settings and known image parameters, template images) to estimate whether concrete parameters or more complex parameters of the hypothetical image may satisfy the image requirement. Any appropriate analysis/comparison technique may be used to determine whether or not the adjustment control satisfies a given image requirement.

When the determination at 625 is YES (i.e., the image requirement is satisfied), the process continues to 630.

At 630, the preprocessor directs the adjustment control to the camera 30.

When the determination at 625 is NO (i.e., the image requirement is not satisfied), the process continues to 635.

At 635, the preprocessor determines whether or not the adjustment control can be modified to satisfy the image requirement.

When the determination at 635 is YES (i.e., the adjustment control can be modified to satisfy the image requirement), the process continues to 640.

At 640, the preprocessor generates a modified adjustment control that satisfies the image requirement and directs the modified adjustment control to the camera 30.

When the determination at 635 is NO (i.e., the adjustment control cannot be modified to satisfy the image requirement), the process continues to 650.

At 650, the preprocessor prevents the adjustment control from adjusting the camera 30. For example, the preprocessor may not route the adjustment control to the camera 30.

Optionally, at 660, the preprocessor transmits a notification. The notification may be included in a command with one or more instructions/messages for one or more consumers based on the analysis. For example, in one or more embodiments according to process 630, the notification may include a confirmation that the adjustment control does not conflict with any image requirements. In another example, in one or more embodiments according to process 640 or 650, the notification may identify any of the following: (1) the image requirement, (2) the adjustment control that cannot satisfy the image requirement; and/or (3) the modified adjustment control (in the case of process 640 only).

One or more of the individual processes shown in the flowcharts of FIGS. 5 and 6 may be omitted, repeated, combined, and/or performed in a different order (e.g., parallelized) than the order shown in this disclosure. For example, the "END" of a method may connect directly to the "START" to execute the method in a continuous loop. Alternatively, or in addition, one or more processes may be combined in one or more embodiments.

Each process may be implemented by hardware (e.g., circuitry, physical components), software (e.g., machine code, programming on non-transitory computer readable media), or any combination thereof. The processes may be performed actively or passively. For example, some steps may be performed using polling or may be interrupt driven in accordance with one or more embodiments of the invention. Additional processes may be performed.

Accordingly, the scope of the invention should not be limited by the specific arrangement as depicted in FIGS. 5 and 6.

Embodiments of the invention may be implemented on virtually any type of computing device 10, regardless of the platform being used. For example, the computing device 10 may be one or more mobile devices (e.g., laptop computer, smart phone, personal digital assistant, tablet computer, or other mobile device), desktop computers, servers, blades in a server chassis, or any other type of computing device or devices that includes at least the minimum processing power, memory, and input and output device(s) (e.g., a display 14) to perform one or more embodiments of the invention. For example, the computing device 10 may include one or more computer processor(s), associated memory (e.g., random access memory (RAM), cache memory, flash memory), one or more storage device(s) (e.g., a hard disk, a solid state drive, an optical drive such as a compact disk (CD) drive or digital versatile disk (DVD) drive, a flash memory stick), and numerous other elements and functionalities. The computer processor(s) may be an integrated circuit for processing instructions. For example, the computer processor(s) may be one or more cores, or micro-cores of a processor. The computing device 10 may also include one or more input device(s), such as the camera 30, an imager, a touchscreen, a keyboard, a mouse, a microphone, a touchpad, an electronic pen, or any other type of input device. Further, the computing device 10 may include one or more output device(s), such as a projector, display screen (e.g., an OLED display or other pixel addressable display device), an external storage, or any other output device. One or more of the output device(s) may be the same or different from the input device(s). The computing device 10 may be connected to a network (e.g., a local area network (LAN), a wide area network (WAN) such as the Internet, mobile network, or any other type of network) via a network interface connection (not shown). The input and output device(s) may be locally or remotely (e.g., via the network) connected to the computer processor(s), memory, and storage device(s). Many different types of computing device 10 exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

One or more of the embodiments of the invention may have one or more of the following improvements to computing devices: reduce wasted computational resources by automatically limiting adjustment controls to ranges that do not inhibit processing; reduce wasted computational resources by sending commands to modify a behavior of consumers of the computing device; improve quality of image processing by preventing generation of poor quality images from the camera; improving user experience by alerting the user or consumers that a change that might defeature the computing device; improve consumer functionality by opening a side channel to programs or hardware with a notification that non-compliant images are coming or a formerly unusable image is now within parameters after modification by the preprocessor.

Although the disclosure has been described with respect to a limited number of embodiments, those skilled in the art, having benefit of this disclosure, will appreciate that various other embodiments may be devised without departing from the scope of the present invention. Accordingly, the scope of the invention should be limited only by the attached claims.

REFERENCE NUMERALS

10 computing device
MB motherboard
12 central processing unit
14 memory
16 graphics processing unit
18 chipset 20 firmware memory
22 embedded controller
24 power control circuit
26 storage device
30 camera

What is claimed is:

1. A method of operating a computing device with a camera, the method comprising:
    obtaining an image requirement from consumers of the camera;
    obtaining, from one of the consumers, an adjustment control for the camera;
    prior to transmitting the adjustment control to the camera:
        identifying the adjustment control;
        determining, without implementing the adjustment control at the camera, whether or not the adjustment control satisfies the image requirement;
        upon determining that the adjustment control satisfies the image requirement, directing the adjustment control to the camera; and
        upon determining that the adjustment control does not satisfy the image requirement, determining whether or not the adjustment control can be modified to satisfy the image requirement;
    obtaining an image from the camera;
    determining, before the image is directed to the consumers, whether or not the image satisfies the image requirement;
    upon determining that the image requirement is satisfied, directing the image to the consumers; and
    upon determining that the image requirement is not satisfied, transmitting a command based on the image being non-compliant with the image requirement.

2. The method of claim 1,
    wherein the image requirement includes a criteria threshold for a facial recognition algorithm,
    wherein the criteria threshold is obtained from a default setting of one of the consumers, a setting input into one of the consumers by a user of the computing device, a predetermined information, or a real-time communication from the consumers.

3. The method of claim 2,
    wherein the criteria threshold is based on a parameter of the image,
    wherein the parameter of the image is one selected from a group comprising: a resolution, a color space, a brightness, an exposure time, a zoom level, and a pan setting.

4. The method of claim 2,
    wherein the criteria threshold is based on a detection algorithm of a computer vision consumer of the consumers,
    wherein the detection algorithm is one selected from a group consisting of: darkness detection; edge detection; face presence detection; and blurring detection.

5. The method of claim 1,
    wherein the command includes a notification that the image is non-compliant with the image requirement,
    wherein, based on the notification, at least one of the consumers modifies an adjustment control range of the camera.

6. The method of claim 1, further comprising:
    upon determining that the adjustment control can be modified to satisfy the image requirement,
        generating a modified adjustment control that satisfies the image requirement, and directing the modified adjustment control to the camera; and
    upon determining that the adjustment control cannot be modified to satisfy the image requirement,
        preventing the adjustment control from adjusting the camera, and
        transmitting a notification that identifies the image requirement and the adjustment control that cannot satisfy the image requirement.

7. The method of claim 1, further comprising:
    transmitting a notification that identifies the image requirement and the adjustment control.

8. A non-transitory computer readable medium (CRM) storing computer readable program code for operating a computing device with a camera, the computer readable program code causes the computing device to:
    obtain an image requirement from consumers of the camera;
    obtain, from one of the consumers, an adjustment control for the camera;
    prior to transmitting the adjustment control to the camera:
        identify the adjustment control;
        determine, without implementing the adjustment control at the camera, whether or not the adjustment control satisfies the image requirement;
        upon determining that the adjustment control satisfies the image requirement, directing the adjustment control to the camera; and
        upon determining that the adjustment control does not satisfy the image requirement, determining whether or not the adjustment control can be modified to satisfy the image requirement;
    obtain an image from the camera;
    determine, before the image is directed to the consumers, whether or not the image satisfies the image requirement;
    upon determining that the image requirement is satisfied, direct the image to the consumers; and
    upon determining that the image requirement is not satisfied, transmit a command based on the image being non-compliant with the image requirement.

9. A computing device comprising:
    a camera configured to generate an image;
    a processor configured to use the image based on consumers of the camera; and
    a preprocessor configured to analyze the image before usage by the processor,
    wherein the preprocessor is configured to:
        obtain an image requirement from consumers of the camera;
        obtain, from one of the consumers, an adjustment control for the camera;
        prior to transmitting the adjustment control to the camera:
            identify the adjustment control;
            determine, without implementing the adjustment control at the camera, whether or not the adjustment control satisfies the image requirement;
            upon determining that the adjustment control satisfies the image requirement, directing the adjustment control to the camera; and
            upon determining that the adjustment control does not satisfy the image requirement, determining whether or not the adjustment control can be modified to satisfy the image requirement;
        obtain an image from the camera;

determine, before the image is directed to the consumers, whether or not the image satisfies the image requirement;

upon determining that the image requirement is satisfied, direct the image to the consumers; and upon determining that the image requirement is not satisfied, transmit a command based on the image being non-compliant with the image requirement.

* * * * *